United States Patent
Salapura et al.

(10) Patent No.: US 10,255,136 B2
(45) Date of Patent: Apr. 9, 2019

(54) DATA BACKUP MANAGEMENT DURING WORKLOAD MIGRATION

(71) Applicant: International Business Machines Corporation, Armonk, NY (US)

(72) Inventors: Valentina Salapura, Chappaqua, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 388 days.

(21) Appl. No.: 14/859,968

(22) Filed: Sep. 21, 2015

(65) Prior Publication Data

US 2017/0083403 A1    Mar. 23, 2017

(51) Int. Cl.
*G06F 17/30* (2006.01)
*G06F 11/14* (2006.01)
*H04L 29/08* (2006.01)

(52) U.S. Cl.
CPC ........ *G06F 11/1448* (2013.01); *G06F 17/303* (2013.01); *H04L 67/10* (2013.01)

(58) Field of Classification Search
CPC ..... G06F 11/1448; G06F 17/303; H04L 67/10
USPC ............... 718/105, 100, 104, 106; 707/999.2
See application file for complete search history.

(56) References Cited

U.S. PATENT DOCUMENTS

| | | |
|---|---|---|
| 8,380,951 B1 | 2/2013 | Krinke, II et al. |
| 8,600,947 B1 | 12/2013 | Freiheit et al. |
| 8,775,376 B2 | 7/2014 | Chavda et al. |
| 8,832,032 B2 | 9/2014 | O'Connor et al. |
| 9,489,397 B1* | 11/2016 | Olson ............... G06F 17/30241 |
| 2009/0070771 A1* | 3/2009 | Yuyitung ............... G06Q 10/06 718/105 |
| 2011/0213883 A1* | 9/2011 | Athey ..................... G06Q 10/06 709/226 |
| 2012/0109844 A1* | 5/2012 | Devarakonda ......... G06Q 10/00 705/348 |
| 2012/0203823 A1* | 8/2012 | Manglik ............... G06F 9/5072 709/203 |

(Continued)

OTHER PUBLICATIONS

Mell et al., "The NIST Definition of Cloud Computing," National Institute of Standards and Technology Special Publication 800-145, Sep. 2011, 7 pages.

*Primary Examiner* — Shiow-Jy Fan
(74) *Attorney, Agent, or Firm* — Yee & Associaites, P.C.; Kristopher Haggerty

(57) ABSTRACT

Managing data backup during workload migration is provided. A set of workloads for migration from a source environment to a target environment is identified in response to receiving a request to migrate the set of workloads. The migration of the set of workloads is initiated from the source environment to the target environment along with migration of backup data corresponding to the set of workloads. A backup configuration transformation from a backup configuration corresponding to the source environment to a set of backup configurations corresponding to the target environment is determined based on semantic matching between characteristics of the backup configuration corresponding to the source environment and characteristics of the set of backup configurations corresponding to the target environment, a state of the source environment, backup configuration transformation actions, and a goal state of the target environment.

14 Claims, 9 Drawing Sheets

(56) References Cited

U.S. PATENT DOCUMENTS

| | | | |
|---|---|---|---|
| 2013/0006943 A1* | 1/2013 | Chavda | G06F 11/1448 707/652 |
| 2014/0019584 A1* | 1/2014 | O'Connor | G06F 17/30079 709/217 |
| 2014/0149494 A1* | 5/2014 | Markley | H04L 67/34 709/203 |
| 2015/0277974 A1* | 10/2015 | Beale | G06F 9/4856 714/19 |
| 2015/0378766 A1* | 12/2015 | Beveridge | G06F 9/45558 718/1 |

* cited by examiner

DATA BACKUP MANAGEMENT DURING WORKLOAD MIGRATION

BACKGROUND

1. Field

The disclosure relates generally to data backup management and more specifically to managing data backup configuration transformation from a backup configuration corresponding to a source virtual machine environment to a set of backup configurations corresponding to a target virtual machine environment during migration of a set of workloads from the source virtual machine environment to the target virtual machine environment.

2. Description of the Related Art

Several companies sell online data backup services for saving data files to a cloud environment. These online data backup services can restore saved data files to a host computer, for example. In addition, these online data backup services may allow a user to retrieve the stored data files with a smart phone or tablet computer or email the stored files to a friend or colleague. While saving data files to a cloud may be convenient and a way to automate data backups, the initial data backup may be slow, taking up to several days, depending on the amount of data to be backed up and the speed of the network connection. In addition, the online data backup services may only back up user-created data files, such as personal files, and not system files, such as those system files required to boot up a system. Thus, these online data backup services only provide partial data backup protection. Further, these online data backup services may only enable backup of a single device, which is not suitable for backup of a data center, for example.

SUMMARY

According to one illustrative embodiment, a computer-implemented method for managing data backup during workload migration is provided. A computer identifies a set of workloads for migration from a source environment to a target environment in response to receiving a request to migrate the set of workloads. The computer initiates the migration of the set of workloads from the source environment to the target environment along with migration of backup data corresponding to the set of workloads. The computer determines a backup configuration transformation from a backup configuration corresponding to the source environment to a set of backup configurations corresponding to the target environment based on semantic matching between characteristics of the backup configuration corresponding to the source environment and characteristics of the set of backup configurations corresponding to the target environment, a state of the source environment, backup configuration transformation actions, and a goal state of the target environment. According to other illustrative embodiments, a computer system and computer program product for managing data backup during workload migration are provided.

DETAILED DESCRIPTION

Figure 1:
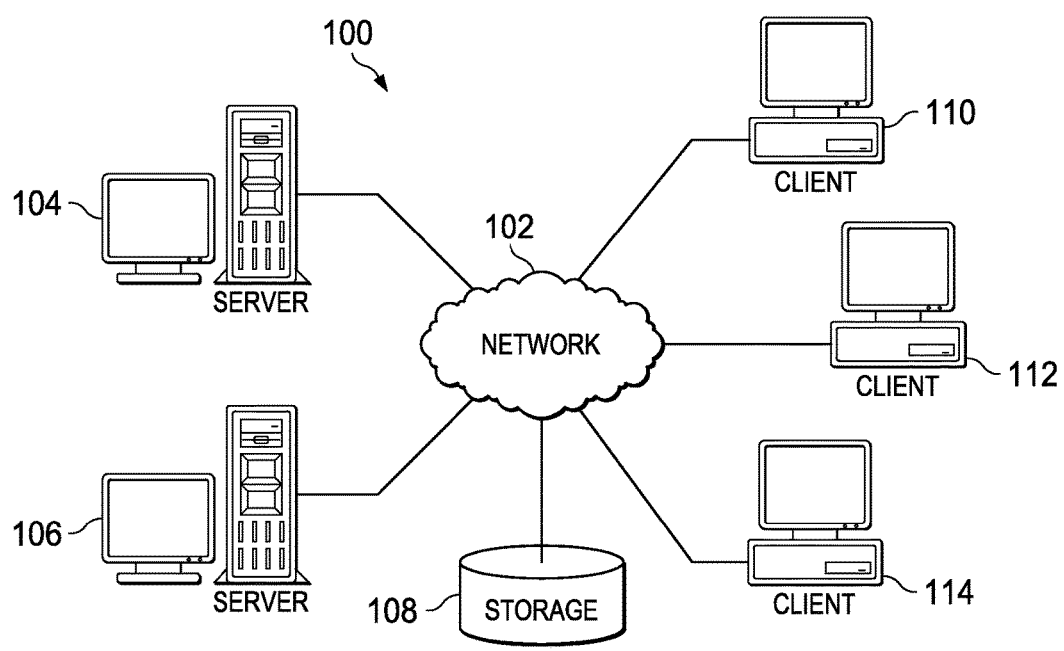
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
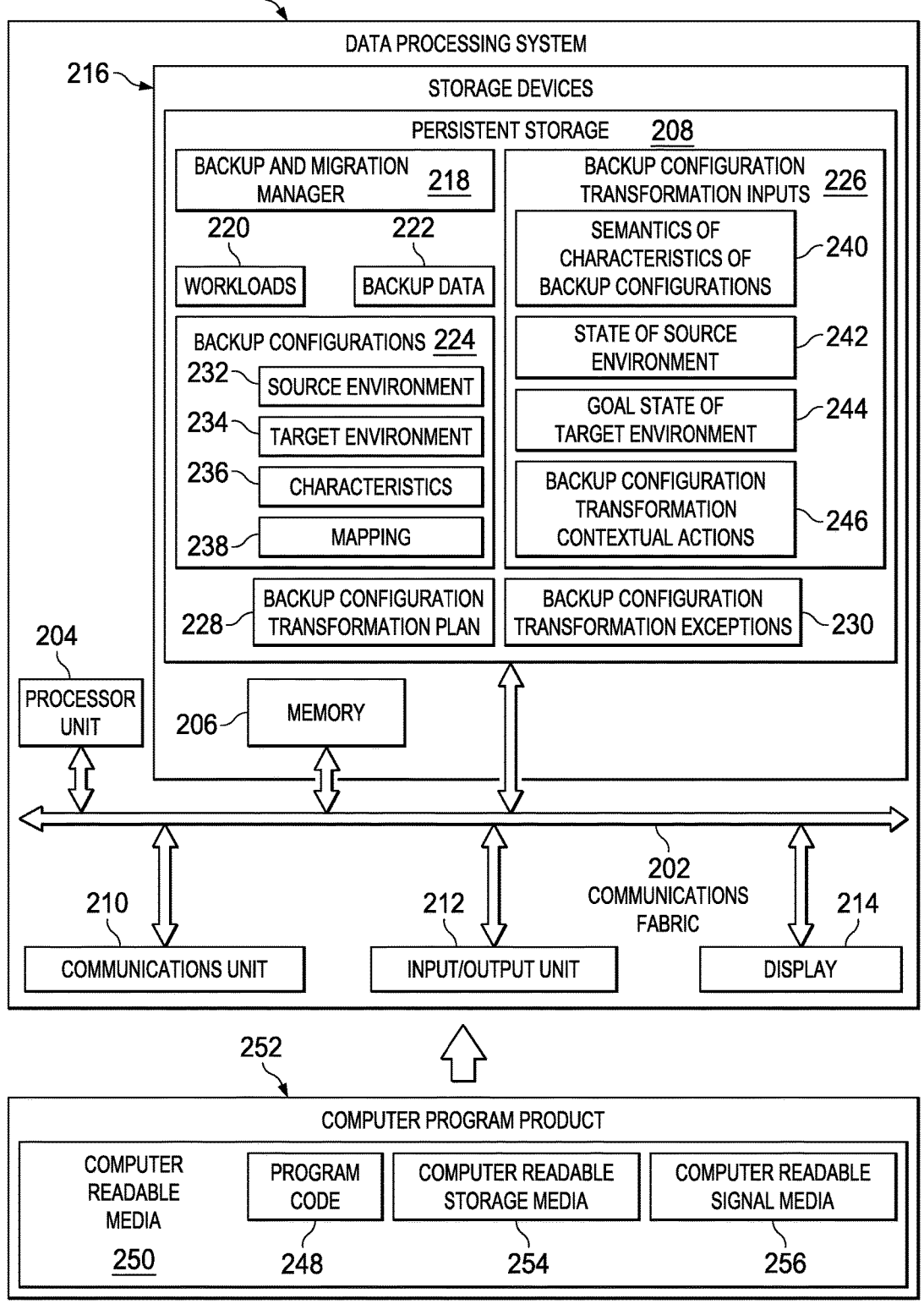
FIG. 2 is a diagram of a data processing system in which illustrative embodiments may be implemented.
Figure 3:
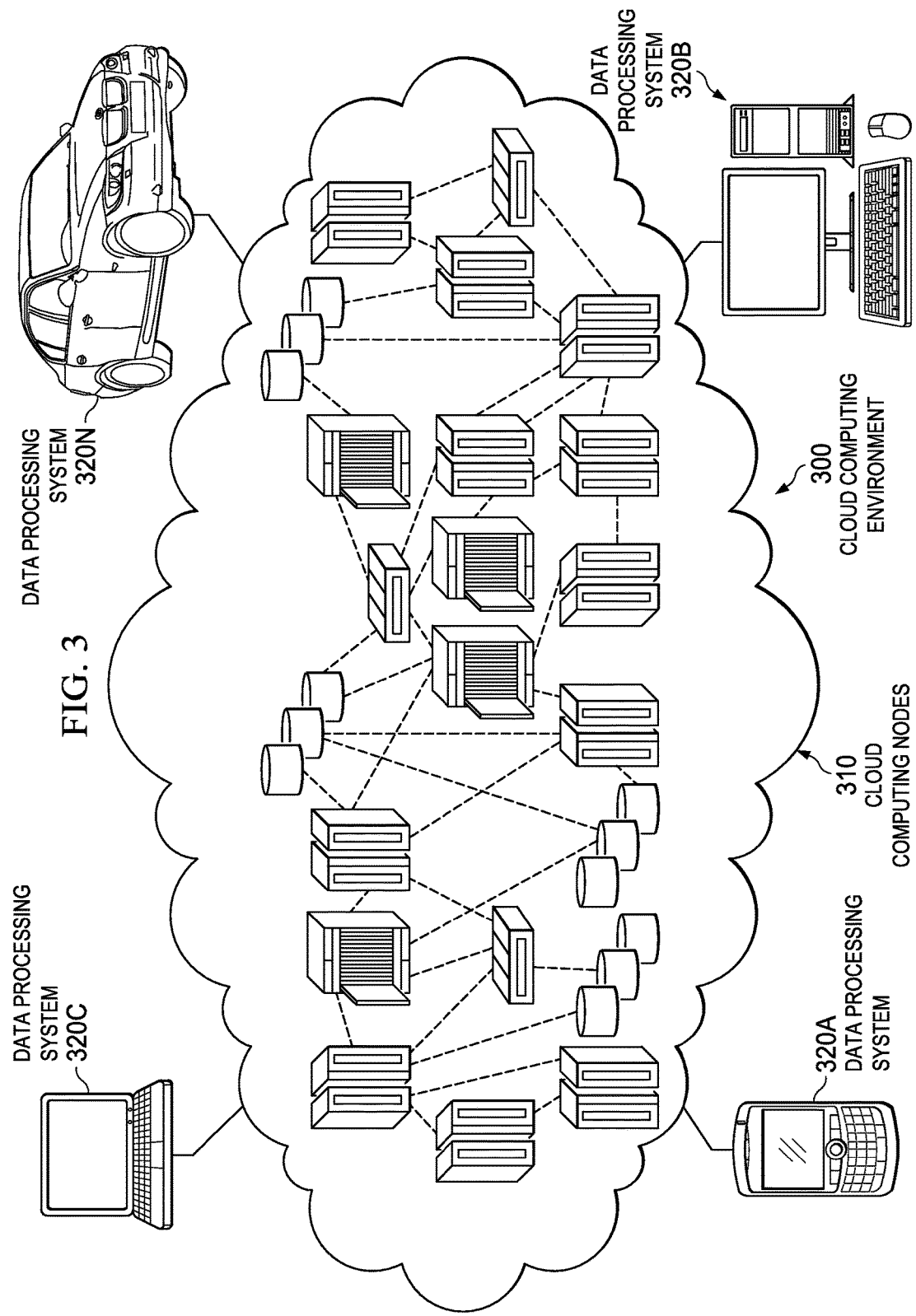
FIG. 3 is a diagram illustrating a cloud computing environment in which illustrative embodiments may be implemented.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers and other devices in which the illustrative embodiments may be implemented. Network data processing system 100 contains network 102, which is the medium used to provide communications links between the computers and the other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide services, such as, for example, managing client workload migration from a source virtual machine environment, such as a data center environment, to a target virtual machine environment, such as a cloud environment, and managing data backup configuration transformation from a data backup configuration corresponding to the source virtual machine environment to a set of data backup configurations corresponding to the target virtual machine environment during migration of the client workload. The backup data corresponds to the client workload being migrated.

Client 110, client 112, and client 114 also connect to network 102. Clients 110, 112, and 114 are clients of server 104 and server 106. Server 104 and server 106 may provide information, such as boot files, operating system images, virtual machine images, and software applications to clients 110, 112, and 114.

In this example, clients 110, 112, and 114 may each represent a different virtual machine environment. A virtual machine environment includes physical resources used to host and execute virtual machines to perform a set of one or more workloads or tasks. A virtual machine environment may comprise, for example, one server, a rack of servers, a cluster of servers, such as a data center, a cloud of computers, such as a private cloud, a public cloud, or a hybrid cloud, or any combination thereof. However, it should be noted that clients 110, 112, and 114 are intended as examples only. In other words, clients 110, 112, and 114 may include other types of data processing systems, such as, for example, network computers, desktop computers, laptop computers, tablet computers, handheld computers, smart phones, personal digital assistants, and gaming devices.

Storage 108 is a network storage device capable of storing any type of data in a structured format or an unstructured format. The type of data stored in storage 108 may be, for example, lists of source virtual machine environments, lists of target virtual machine environments, characteristics or properties of each listed source and target virtual machine environment, and backup configuration transformation plans for transforming a source environment's data backup configuration to a target environment's data backup configuration during migration of a workload from the source environment to the target environment. Further, storage unit 108 may store other types of data, such as authentication or credential data that may include user names, passwords, and biometric data associated with system administrators.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), and a wide area network (WAN). FIG. 1 is intended as an example only, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores backup and migration manager 218, workloads 220, backup data 222, backup configurations 224, backup configuration transformation inputs 226, backup configuration transformation plan 228, and backup configuration transformation exception 230. However, illustrative embodiments are not limited to such. In other words, persistent storage 208 may store more or less information than illustrated.

Backup and migration manager 218 controls the migration of a set of one or more client workloads, such as workloads 220, from a source virtual machine environment to a target virtual machine environment, along with the migration of backup data, such as backup data 222, corresponding to the set of one or more client workloads to be migrated from the source to target environments. The source virtual machine environment may be, for example, client 110 in FIG. 1. The target virtual machine environment may be, for example, client 112 in FIG. 1. Further, backup and migration manager 218 controls the backup configuration transformation from a data backup configuration corresponding to the source environment to a data backup configuration corresponding to the target environment. It should be noted that even though backup and migration manager 218 is illustrated as residing in persistent storage 208, in an alternative illustrative embodiment backup and migration manager 218 may be a separate component of data processing system 200. For example, backup and migration manager 218 may be a hardware component coupled to communication fabric 202 or a combination of hardware and software components.

Workloads 220 represent a list of different workloads that backup and migration manager 218 is to migrate from the source environment to the target environment. Backup data 222 represent the backed up data of the source environment corresponding to workloads 220 that backup and migration manager 218 is to migrate with workloads 220 from the source environment to the target environment. Backup configurations 224 represent the data backup configurations corresponding to the source and target environments, such as source environment 232 and target environment 234. Source environment 232 may represent, for example, a data center environment. Target environment 234 may represent, for example, a cloud environment. Characteristics 236 are the properties or attributes of backup configurations 224. Characteristics 236 may include, for example, data dependencies between virtual machines executing workloads 220.

Backup and migration manager 218 utilizes backup configuration transformation inputs 226 to transform the data backup configuration corresponding to source environment 232 to the data backup configuration corresponding to target environment 234. In this example, backup configuration transformation inputs 226 include semantics of characteristics of backup configurations 240, state of source environment 242, goal state of target environment 244, and backup configuration transformation contextual actions 246. Semantics of characteristics of backup configurations 240 are descriptions of characteristics 236 for backup configurations 224. State of source environment 242 is a current state of source environment 232 prior to migration of workloads 220. Goal state of target environment 244 is a goal state of target environment 234 after migration of workloads 220 and corresponding backup data 222. Backup configuration transformation contextual actions 246 are a set of one or more action steps that backup and migration manager 218 takes to achieve the backup configuration transformation from the data backup configuration corresponding to source environment 232 to the data backup configuration corresponding to target environment 234.

Backup configuration transformation plan 228 is a strategy for transforming the data backup configuration corresponding to source environment 232 to the data backup configuration corresponding to target environment 234. Backup and migration manager 218 generates backup configuration transformation plan 228 based on information in workloads 220, backup data 222, backup configurations 224, and backup configuration transformation inputs 226. Backup configuration transformation exception 230 is a possible exception that may be thrown when backup and migration manager 218 executes backup configuration transformation plan 228. Backup configuration transformation exception 230 may be, for example, an unknown backup configuration exception, a new data backup technology exception, a change in target environment exception, or an unknown exception.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 248 is located in a functional form on computer readable media 250 that is selectively removable and may be loaded onto or transferred to data processing system 200 for running by processor unit 204. Program code 248 and computer readable media 250 form computer program product 252. In one example, computer readable media 250 may be computer readable storage media 254 or computer readable signal media 256. Computer readable storage media 254 may include, for example, an optical or magnetic disc that is inserted or placed into a drive or other device that is part of persistent storage 208 for transfer onto a storage device, such as a hard drive, that is part of persistent storage 208. Computer readable storage media 254 also may take the form of a persistent storage, such as a hard drive, a thumb drive, or a flash memory that is connected to data processing system 200. In some instances, computer readable storage media 254 may not be removable from data processing system 200.

Alternatively, program code 248 may be transferred to data processing system 200 using computer readable signal media 256. Computer readable signal media 256 may be, for example, a propagated data signal containing program code 248. For example, computer readable signal media 256 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 248 may be downloaded over a network to persistent storage 208 from another device or data processing system through computer readable signal media 256 for use within data processing system 200. For instance, program code stored in a computer readable storage media in a data processing system may be downloaded over a network from the data processing system to data processing system 200. The data processing system providing program code 248 may be a server computer, a client computer, or some other device capable of storing and transmitting program code 248.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 254 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

It should be understood that although this disclosure includes a detailed description on cloud computing, implementation of the teachings recited herein are not limited to a cloud computing environment. Rather, illustrative embodiments are capable of being implemented in conjunction with any other type of computing environment now known or later developed. Cloud computing is a model of service delivery for enabling convenient, on-demand network access to a shared pool of configurable computing resources, such as, for example, networks, network bandwidth, servers, processing, memory, storage, applications, virtual machines, and services, which can be rapidly provisioned and released with minimal management effort or interaction with a provider of the service. This cloud model may include at least five characteristics, at least three service models, and at least four deployment models.

The characteristics may include, for example, on-demand self-service, broad network access, resource pooling, rapid elasticity, and measured service. On-demand self-service allows a cloud consumer to unilaterally provision computing capabilities, such as server time and network storage, as needed automatically without requiring human interaction with the provider of the service. Broad network access provides for capabilities that are available over a network and accessed through standard mechanisms, which promotes use by heterogeneous thin or thick client platforms, such as, for example, mobile phones, laptops, and personal digital assistants. Resource pooling allows the provider's computing resources to be pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction, such as, for example, country, state, or data center. Rapid elasticity provides for capabilities that can be rapidly and elastically provisioned, in some cases automatically, to quickly scale out and rapidly released to quickly scale in. To the consumer, the capabilities available for provisioning often appear to be unlimited and can be purchased in any quantity at any time. Measured service allows cloud systems to automatically control and optimize resource use by leveraging a metering capability at some level of abstraction appropriate to the type of service, such as, for example, storage, processing, bandwidth, and active user accounts. Resource usage can be monitored, controlled, and reported providing transparency for both the provider and consumer of the utilized service.

Service models may include, for example, Software as a Service (SaaS), Platform as a Service (PaaS), and Infrastructure as a Service (IaaS). Software as a Service is the capability provided to the consumer to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings. Platform as a Service is the capability provided to the consumer to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. Infrastructure as a Service is the capability provided to the consumer to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components, such as, for example, host firewalls.

Deployment models may include, for example, a private cloud, community cloud, public cloud, and hybrid cloud. A private cloud is a cloud infrastructure operated solely for an organization. The private cloud may be managed by the organization or a third party and may exist on-premises or off-premises. A community cloud is a cloud infrastructure shared by several organizations and supports a specific community that has shared concerns, such as, for example, mission, security requirements, policy, and compliance considerations. The community cloud may be managed by the organizations or a third party and may exist on-premises or off-premises. A public cloud is a cloud infrastructure made available to the general public or a large industry group and is owned by an organization selling cloud services. A hybrid cloud is a cloud infrastructure composed of two or more clouds, such as, for example, private, community, and public clouds, which remain as unique entities, but are bound together by standardized or proprietary technology that enables data and application portability, such as, for example, cloud bursting for load-balancing between clouds.

A cloud computing environment is service oriented with a focus on statelessness, low coupling, modularity, and semantic interoperability. At the heart of cloud computing is an infrastructure comprising a network of interconnected nodes.

With reference now to FIG. 3, a diagram illustrating a cloud computing environment is depicted in which illustrative embodiments may be implemented. In this illustrative example, cloud computing environment 300 includes a set of one or more cloud computing nodes 310 with which local data processing systems used by cloud consumers may communicate. Cloud computing nodes 310 may be, for example, server 104 and server 106 in FIG. 1. Local data processing systems that communicate with cloud computing nodes 310 include data processing system 320A, which may be a personal digital assistant or a smart phone, data processing system 320B, which may be a desktop computer or a network computer, data processing system 320C, which may be a laptop computer, and data processing system 320N, which may be a computer system of an automobile. Data processing systems 320A-320N may be, for example, clients 110-114 in FIG. 1.

Cloud computing nodes 310 may communicate with one another and may be grouped physically or virtually into one or more cloud computing networks, such as a private cloud computing network, a community cloud computing network, a public cloud computing network, or a hybrid cloud computing network. This allows cloud computing environment 300 to offer infrastructure, platforms, and/or software as services without requiring the cloud consumers to maintain these resources on their local data processing systems, such as data processing systems 320A-320N. It is understood that the types of data processing devices 320A-320N are intended to be examples only and that cloud computing nodes 310 and cloud computing environment 300 can communicate with any type of computerized device over any type of network and/or network addressable connection using a web browser, for example.

Figure 4:
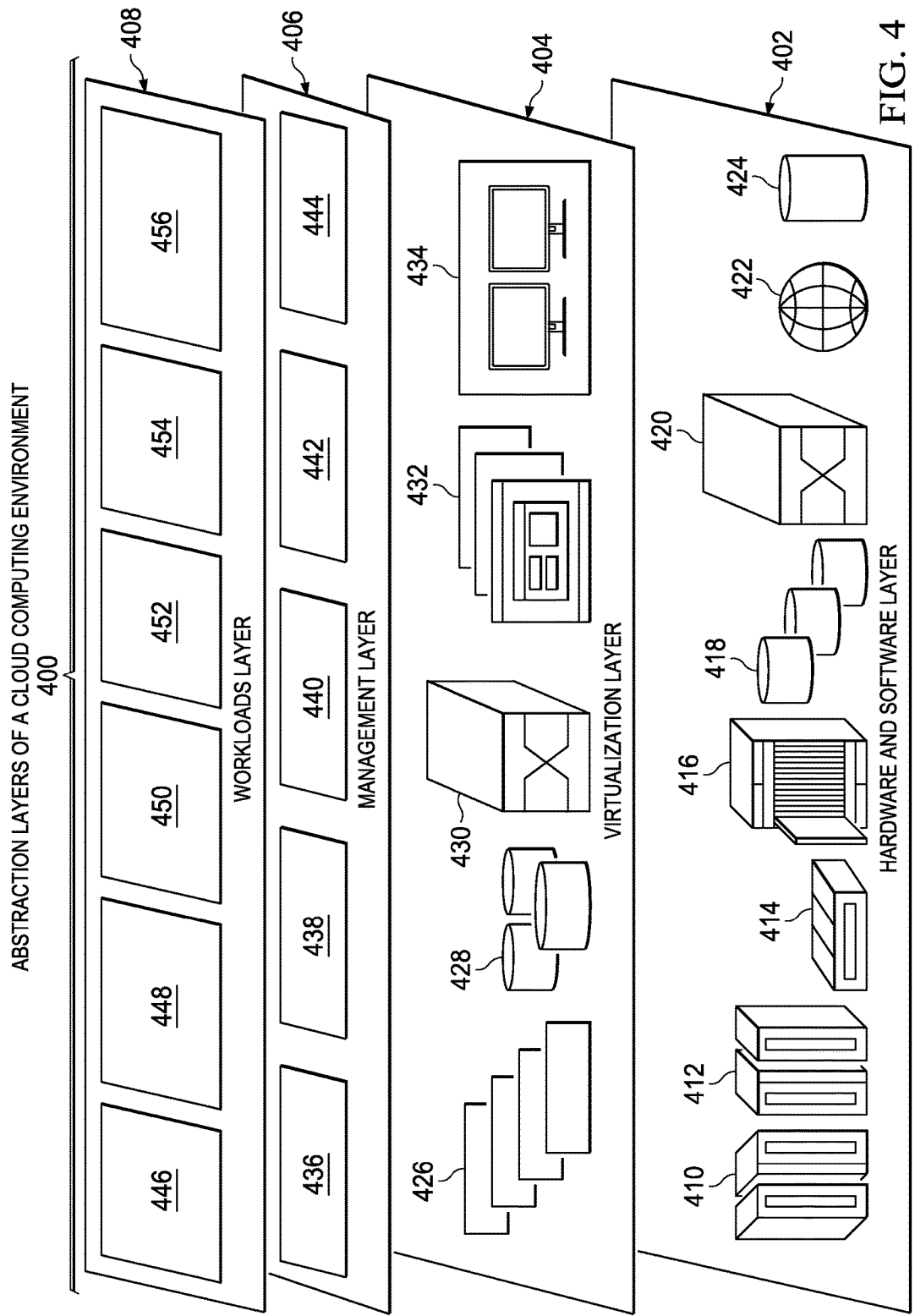
FIG. 4 is a diagram illustrating an example of abstraction layers of a cloud computing environment in accordance with an illustrative embodiment.

With reference now to FIG. 4, a diagram illustrating an example of abstraction layers of a cloud computing environment is depicted in accordance with an illustrative embodiment. The set of functional abstraction layers shown in this illustrative example may be implemented in a cloud computing environment, such as cloud computing environment 300 in FIG. 3. Also, it should be noted that the layers, components, and functions shown in FIG. 4 are intended to be examples only and not intended to be limitations on illustrative embodiments.

In this example, abstraction layers of a cloud computing environment 400 includes hardware and software layer 402, virtualization layer 404, management layer 406, and workloads layer 408. Hardware and software layer 402 includes the hardware and software components of the cloud computing environment. The hardware components may include, for example, mainframes 410, RISC (Reduced Instruction Set Computer) architecture-based servers 412, servers 414, blade servers 416, storage devices 418, and networks and networking components 420. In some illustrative embodiments, software components may include, for example, network application server software 422 and database software 424.

Virtualization layer 404 provides an abstraction layer from which the following examples of virtual entities may be provided: virtual servers 426; virtual storage 428; virtual networks 430 including virtual private networks; virtual applications and operating systems 432; and virtual machines 434.

Management layer 406 may provide a plurality of different management functions, such as, for example, resource provisioning 436, metering and pricing 438, security and user portal 440, service level management 442, and virtual machine environment management 444. Resource provisioning 436 dynamically procures computing resources and other resources, which are utilized to perform workloads or tasks within the cloud computing environment. Metering and pricing 438 provides cost tracking as resources are utilized within the cloud computing environment and billing for consumption of these resources. In one example, these resources may comprise application software licenses. Security of security and user portal 440 provides identity verification for cloud consumers and workloads, as well as protection for data and other resources. User portal of security and user portal 440 provides access to the cloud computing environment for cloud consumers and system administrators. Service level management 442 provides cloud computing resource allocation and management such that required service levels are met based on service level agreements. Virtual machine environment management 444 provides management of virtual machine migration from a source virtual machine environment, such as a data center, to a target virtual machine environment, such as a cloud.

Workloads layer 408 provides the functionality of the cloud computing environment. Example workloads and functions provided by workload layer 408 may include mapping and navigation 446, software development and lifecycle management 448, virtual classroom education delivery 450, data analytics processing 452, transaction processing 454, and migrating client workloads and backup data from source to target virtual machine environments 456.

In the course of developing illustrative embodiments, it was discovered that in order for newly migrated workloads to take full advantage of a cloud environment, a transformation from legacy management services corresponding to a source environment to cloud native services corresponding to a target environment is needed. For example, an automated backup configuration transformation from a source backup manager type service to a target native cloud service or architecture is needed. Typically, this workload migration is a disruptive process and customer data may be lost. In addition, during the workload migration data backup is discontinued in the old source legacy environment and not yet set up in the new target cloud environment. Further, setting up a data backup configuration is still largely a manual task post-migration.

Illustrative embodiments migrate all workloads and their corresponding data concurrently from a source legacy environment into a new cloud environment or into two or more different cloud environments. Illustrative embodiments may perform the workload migration in waves, meaning that a number of virtual machine images and their corresponding data are moved from one environment into another. The determination of which virtual machine images belong to a single wave is based on a number of characteristics. One characteristic is data dependency. For example, illustrative embodiments may migrate all virtual machine images that are using the same data (e.g., having read or write access to the same data) in the same wave.

Illustrative embodiments automatically analyze a data backup configuration of the source environment. In one illustrative embodiment, the illustrative embodiment performs a data backup with a backup manager, where one or more backup manager servers are receiving backup data. Illustrative embodiments arrange data backups so that there are occasional full data backups followed by incremental data backups. Illustrative embodiments allocate all virtual machine images to one backup manager server and send data for incremental data backup periodically. Illustrative embodiments write data in the order the data are received, meaning that backup data segments from different virtual machine images are saved sequentially and intermingled on storage or tapes. In addition, illustrative embodiments may encode data for data security. Before workload migration, illustrative embodiments perform a full data backup for all virtual machine images in a particular wave.

Once illustrative embodiments migrate a wave of virtual machine images into a new target environment, such as a cloud, illustrative embodiments establish a new backup configuration corresponding to the new target environment. In one illustrative embodiment, the illustrative embodiment may perform the migration with a backup manager configuration. In another illustrative embodiment, the illustrative embodiment may utilize some other data backup configuration.

Illustrative embodiments identify patterns of existing (e.g., legacy) backup configurations and propose an automated approach for transforming the existing data backup configuration to a new cloud-enabled data backup configuration. This approach is based on artificial intelligence (AI) planning, which illustrative embodiments utilize to dynamically assemble a set of services, such as, for example, application programming interfaces, to automate the process of data backup configuration transformation from a source data backup configuration to a target data backup configuration. Because multiple classes of client workloads and their corresponding data backup configurations may exist, illustrative embodiments utilize this dynamic/adaptation approach in real time.

Thus, illustrative embodiments provide for automatic conversion to the new service management stack and registration with the appropriate services to handle the backup configuration transformation process based on automation patterns that specify atomic and complex actions for transformation, which enables interleaved or concurrent workload migration and data backup management processes. As a result, illustrative embodiments may reduce the time for full steady state data backup configuration transformation to cloud native services. In addition, illustrative embodiments also may decrease ongoing platform and support costs.

Figure 5:
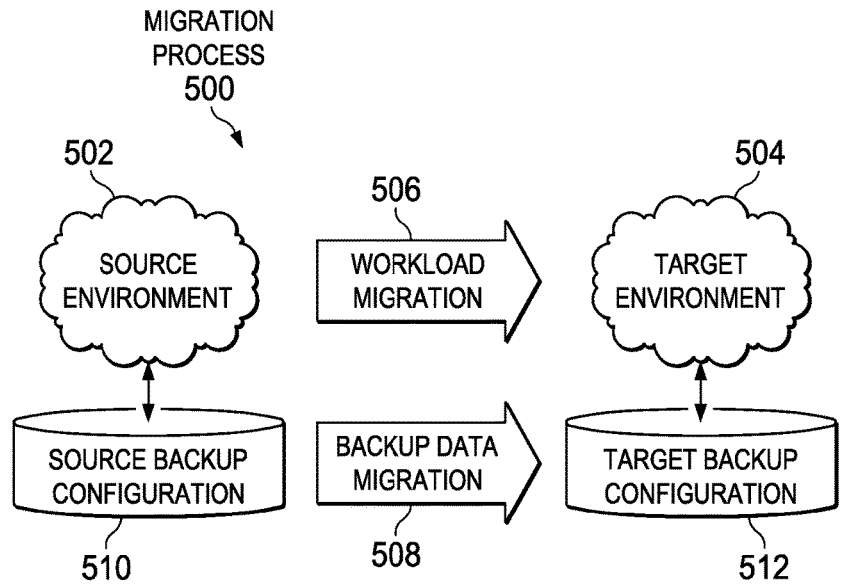
FIG. 5 is a diagram of an example of a migration process in accordance with an illustrative embodiment.

With reference now to FIG. 5, a diagram of an example of a migration process is depicted in accordance with an illustrative embodiment. Migration process 500 may be implemented in a network of data processing systems, such as, for example, network data processing system 100 in FIG. 1. In addition, migration process 500 may be performed by a backup and migration manager, such as, for example, backup and migration manager 218 in data processing system 200 in FIG. 2.

During migration process 500, the backup and migration manager migrates a client workload from source environment 502 to target environment 504. Source environment 502 may be, for example, a data center environment. Target environment 504 may be, for example, another data center environment or a cloud environment.

The backup and migration manager performs workload migration 506 and backup data migration 508 from source environment 502 to target environment 504. Workload migration 506 represents the migration of a set of one or more client workloads with all corresponding virtual machine images. Backup data migration 508 represents the migration of all backed up data corresponding to the set of client workloads being migrated in workload migration 506. It should be noted that the backup and migration manager may perform workload migration 506 and backup data migration 508 concurrently.

The backup and migration manager automatically identifies patterns of the existing data backup configuration (i.e., source backup configuration 510), which corresponds to source environment 502. In addition, the backup and migration manager automatically identifies patterns of the new data backup configuration (i.e., target backup configuration 512), which corresponds to target environment 504. The backup and migration manager also analyzes the characteristics, such as data dependencies, of source backup configuration 510 and then automatically maps those characteristics to characteristics of target backup configuration 512 corresponding to target environment 504. After mapping the characteristics of the two data backup configurations, the backup and migration manager automatically determines and generates a backup configuration transformation solution or plan. The backup configuration transformation solution may be, for example, backup configuration transformation plan 228 in FIG. 2.

Further, the backup and migration manager assembles a set of one or more services, such as application programming interfaces, using artificial intelligence planning. The backup and migration manager implements the backup configuration transformation plan using the set of assembled services. The backup and migration manager automatically performs data backup in target environment 504 while executing the backup configuration transformation solution.

As an example use case, source environment 502 utilizes a tape-based data backup configuration. The tapes are stored in a vault and data recovery is from the tapes. Target environment 504 offers a remote tape-based data backup configuration. The data in backup data migration 508 are de-duplicated and copied into another data center. Data recovery is based on data center data.

As another example use case, source environment 502 utilizes a tape-based data backup configuration. Target environment 504 offers a remote disk-based data backup configuration using data mirroring, for example. Target environment 504 does not offer data backup to tape capability. As the two example use cases illustrate above, the backup and migration manager will have to determine a backup configuration transformation plan for transforming source backup configuration 510 to target backup configuration 512 to accommodate backup data migration 508.

Figure 6:
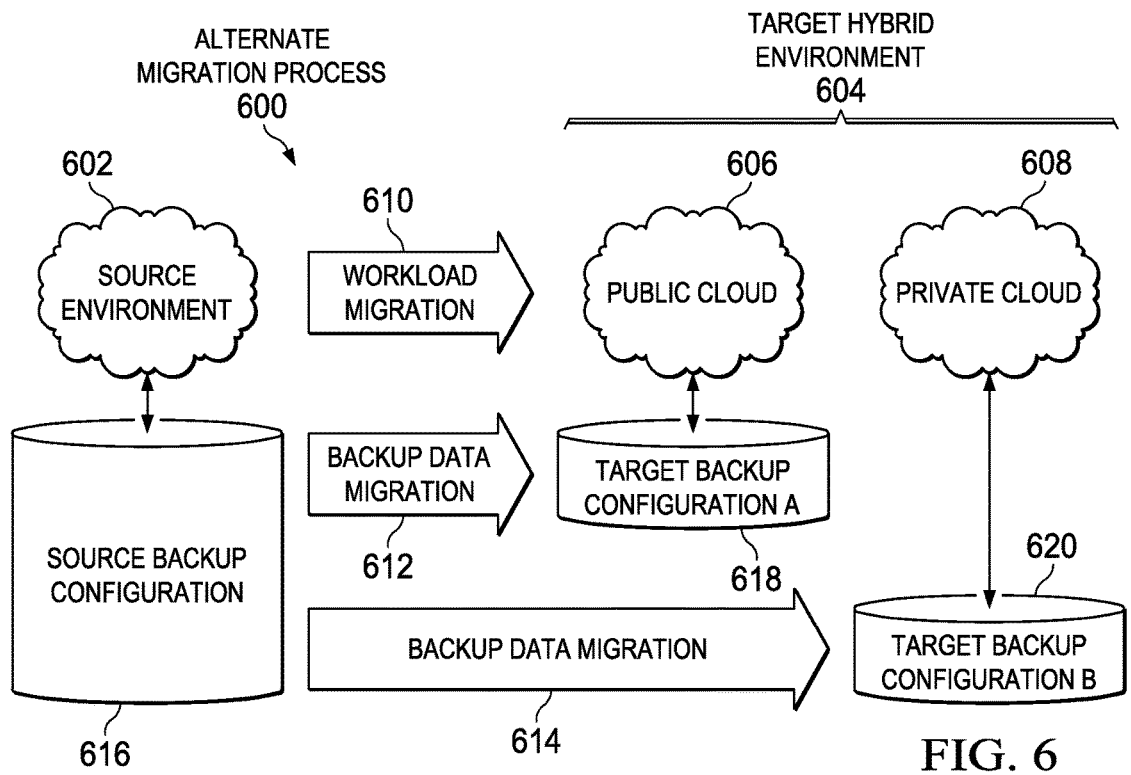
FIG. 6 is a diagram of an example of an alternate migration process in accordance with an illustrative embodiment.

With reference now to FIG. 6, a diagram of an example of an alternate migration process is depicted in accordance with an illustrative embodiment. Alternate migration process 600 may be implemented in a network of data processing systems, such as, for example, network data processing system 100 in FIG. 1. In addition, alternate migration process 600 may be performed by a backup and migration manager, such as, for example, backup and migration manager 218 in data processing system 200 in FIG. 2.

During alternate migration process 600, the backup and migration manager migrates a client workload from source environment 602 to target hybrid environment 604. Source environment 602 may be, for example, a data center environment. Target hybrid environment 604 may be, for example, a combination of another data center environment and a cloud environment, a combination of different cloud environments, or any type combination of different data processing environments. In this example, target hybrid environment 604 includes public cloud 606 and private cloud 608.

The backup and migration manager performs workload migration 610, backup data migration 612, and backup data migration 614 from source environment 602 to target hybrid environment 604. Workload migration 610 represents the migration of a set of one or more client workloads with all corresponding virtual machine images. Backup data migration 612 and backup data migration 614 represent the migration of all backed up data corresponding to the set of client workloads being migrated in workload migration 610. However, it should be noted in this example that the backup and migration manager sends backup data migration 612 to public cloud 606 and sends backup data migration 614 to private cloud 608. Also, it should be noted that the backup and migration manager may perform workload migration 610, backup data migration 612, and backup data migration 614 concurrently.

The backup and migration manager automatically identifies patterns of the existing data backup configuration (i.e., source backup configuration 616), which corresponds to source environment 602. In addition, the backup and migration manager automatically identifies patterns of the new set of data backup configurations (i.e., target backup configuration A 618 and target backup configuration B 620), which correspond to public cloud 606 and private cloud 608, respectively, in target hybrid environment 604. The backup and migration manager also analyzes the characteristics of source backup configuration 616 and then automatically maps those characteristics to characteristics of target backup configuration A 618 corresponding to public cloud 606 and characteristics of target backup configuration B 620 corresponding to private cloud 608. After mapping the characteristics of the different data backup configurations, the backup and migration manager automatically determines and generates a backup configuration transformation plan. The backup configuration transformation plan may be, for example, backup configuration transformation plan 228 in FIG. 2.

Further, the backup and migration manager assembles a set of one or more services, such as application programming interfaces, using artificial intelligence planning. The backup and migration manager implements the backup configuration transformation plan using the set of assembled services. The backup and migration manager automatically performs data backup in public cloud 606 and private cloud 608 while executing the backup configuration transformation plan.

Figure 7:
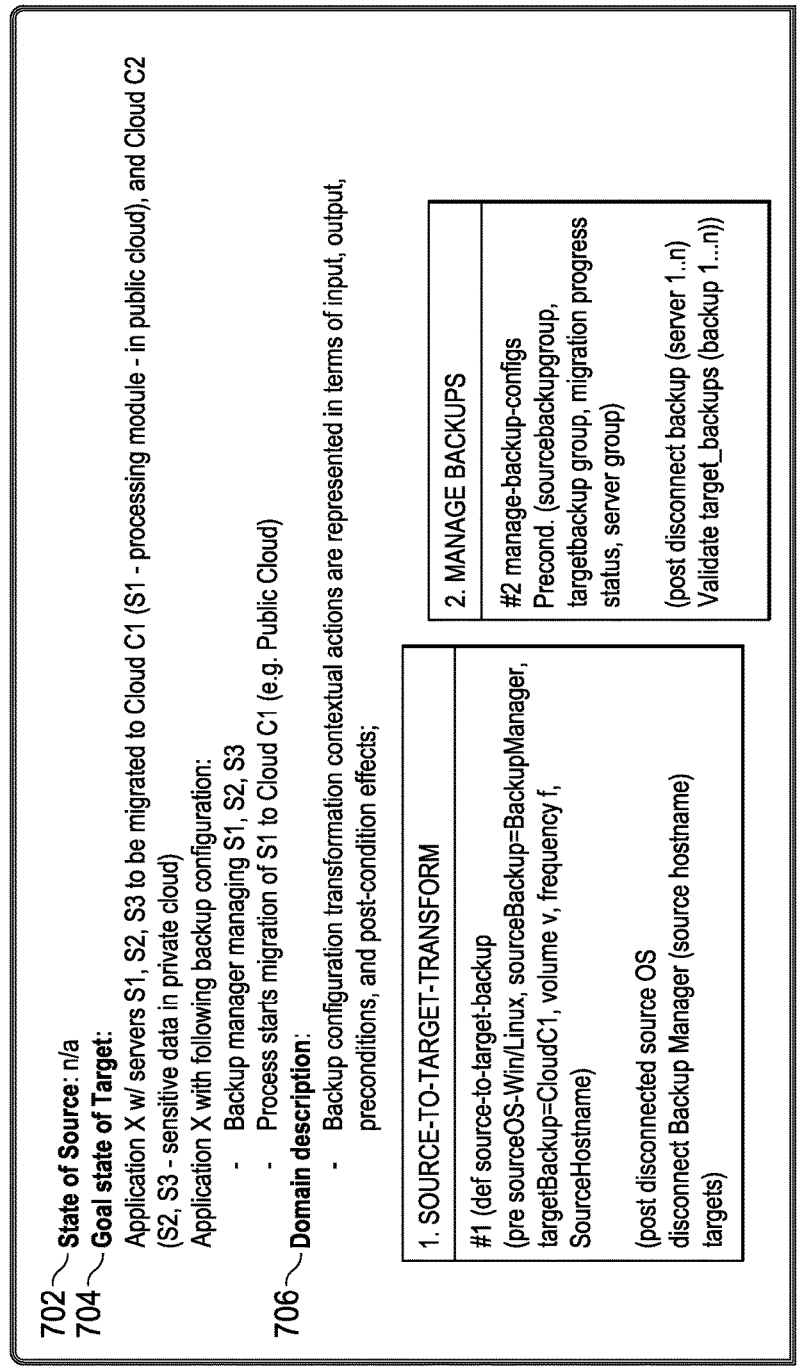
FIG. 7 is a specific example of backup configuration transformation inputs in accordance with an illustrative embodiment.

With reference now to FIG. 7, a specific example of backup configuration transformation inputs is depicted in accordance with an illustrative embodiment. Backup configuration transformation inputs 700 may be, for example, backup configuration transformation inputs 226 in FIG. 2. In this example, backup configuration transformation inputs 700 include state of source 702, goal state of target 704, and domain description 706.

State of source 702 may be, for example, state of source environment 242 in FIG. 2. State of source 702 defines a current state of a source environment, such as source environment 502 in FIG. 5. Goal state of target 704 may be, for example, goal state of target environment 244 in FIG. 2. Goal state of target 704 defines a goal state of a target environment, such as target environment 506 in FIG. 5, after migration of a workload and its corresponding backup data, such as workload migration 506 and backup data migration 508 in FIG. 5.

As an example of goal state of target 704, application X, along with virtual servers S1, S2, S3, are to be migrated to a target hybrid cloud environment. Specifically, virtual server S1 is to be migrated to Cloud C1 (i.e., virtual server S1 is a processing module in a public cloud, such as public cloud 606 in FIG. 6). In addition, virtual servers S2 and S3 are to be migrated to Cloud C2 (i.e., virtual servers S2 and S3 store sensitive data in a private cloud, such as private cloud 608 in FIG. 6). Application X has the following data backup configuration: backup manager managing virtual servers S1, S2, and S3. Process starts migration of virtual sever S1 to public Cloud C1 and migration of virtual servers S2 and S3 to private Cloud C2.

Domain description 706 may be, for example, backup configuration transformation contextual actions 246 in FIG. 2. Domain description 706 defines backup configuration transformation actions in terms of input, output, preconditions, and post-condition effects.

Figure 8A:
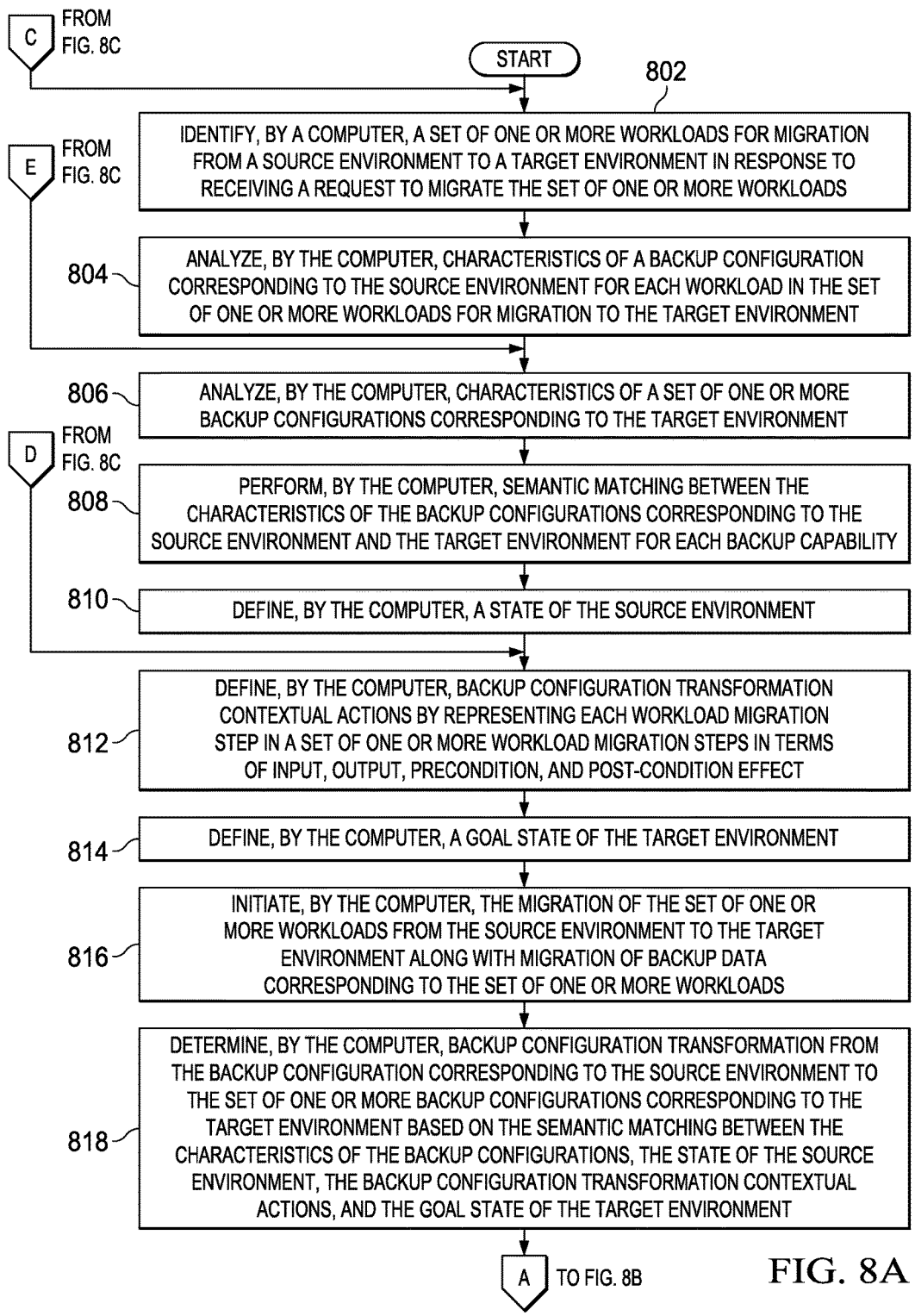
FIGS. 8A-8C are a flowchart illustrating a process for managing data backup during workload migration in accordance with an illustrative embodiment.
Figure 8B:
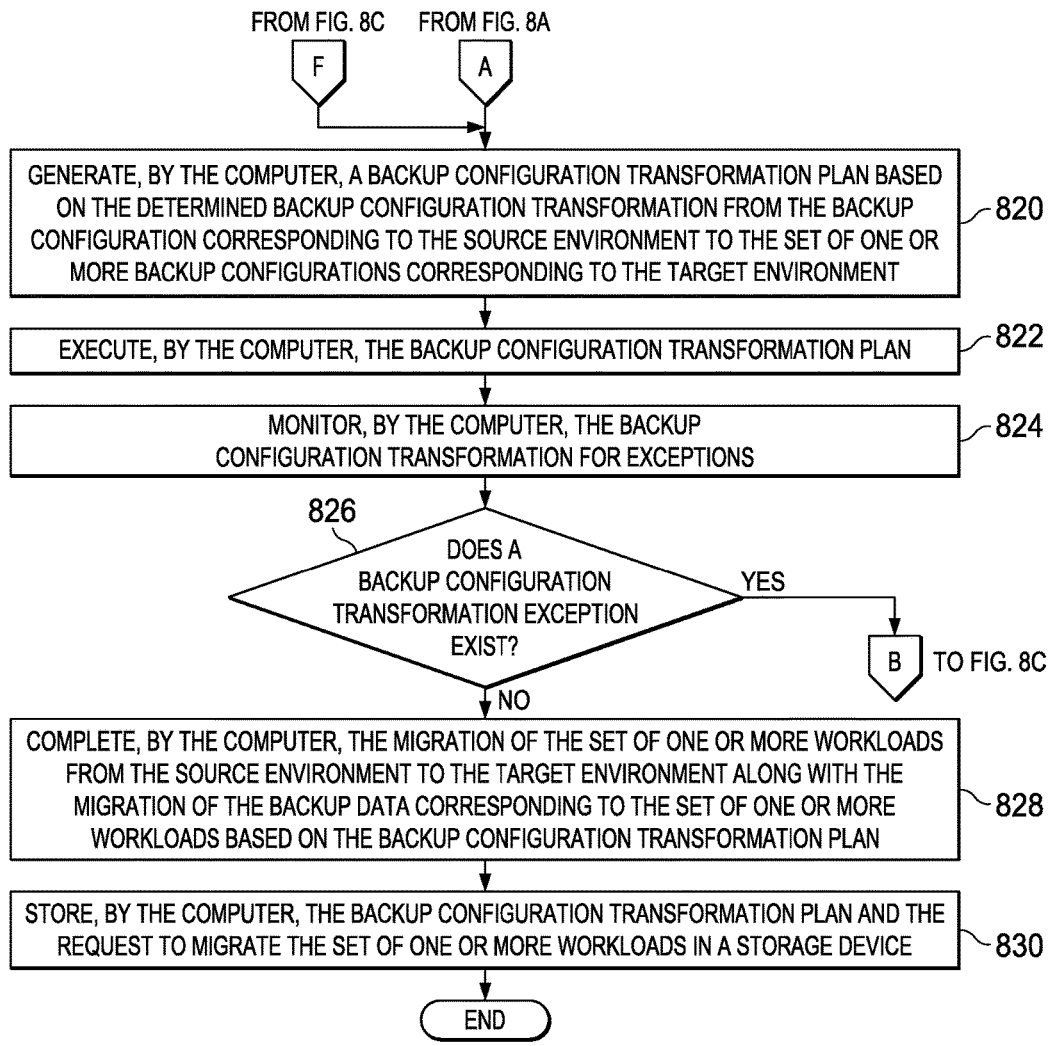
Figure 8C:
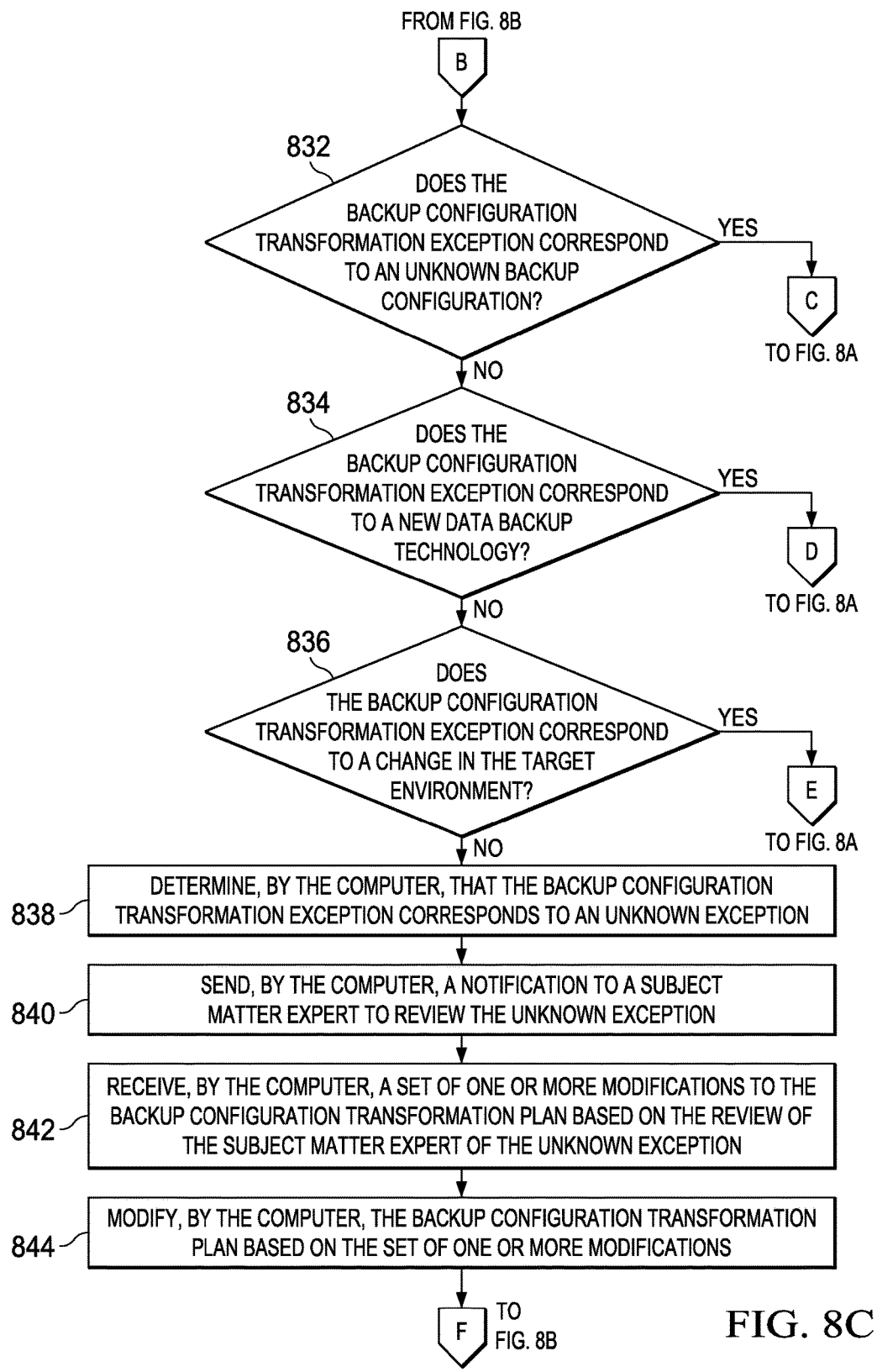

With reference now to FIGS. 8A-8C, a flowchart illustrating a process for managing data backup during workload migration is shown in accordance with an illustrative embodiment. The process shown in FIGS. 8A-8C may be implemented in a computer, such as, for example, server 104 in FIG. 1 and data processing system 200 in FIG. 2.

The process begins when the computer identifies a set of one or more workloads for migration from a source environment to a target environment in response to receiving a request to migrate the set of one or more workloads (step 802). The computer analyzes characteristics of a backup configuration corresponding to the source environment for each workload in the set of one or more workloads for migration to the target environment (step 804). In addition, the computer analyzes characteristics of a set of one or more backup configurations corresponding to the target environment (step 806).

Afterward, the computer performs semantic matching between the characteristics of the backup configurations corresponding to the source environment and the target environment for each backup capability (step 808). The computer also defines a state of the source environment (step 810). Further, the computer defines backup configuration transformation contextual actions by representing each workload migration step in a set of one or more workload migration steps in terms of input, output, precondition, and post-condition effect (step 812). Furthermore, the computer defines a goal state of the target environment (step 814).

Subsequently, the computer initiates the migration of the set of one or more workloads from the source environment to the target environment along with migration of backup data corresponding to the set of one or more workloads (step 816). In addition, the computer determines backup configuration transformation from the backup configuration corresponding to the source environment to the set of one or more backup configurations corresponding to the target environment based on the semantic matching between the characteristics of the backup configurations, the state of the source environment, the backup configuration transformation contextual actions, and the goal state of the target environment (step 818). Then, the computer generates a backup configuration transformation plan based on the determined backup configuration transformation from the backup configuration corresponding to the source environment to the set of one or more backup configurations corresponding to the target environment (step 820).

Further, the computer executes the backup configuration transformation plan (step 822). The computer also monitors the backup configuration transformation for exceptions (step 824). The computer makes a determination as to whether a backup configuration transformation exception exists (step 826).

If the computer determines that a backup configuration transformation exception does not exist, no output of step 826, then the computer completes the migration of the set of one or more workloads from the source environment to the target environment along with the migration of the backup data corresponding to the set of one or more workloads based on the backup configuration transformation plan (step 828). In addition, the computer stores the backup configuration transformation plan and the request to migrate the set of one or more workloads in a storage device (step 830). Thereafter, the process terminates.

Returning again to step 826, if the computer determines that a backup configuration transformation exception does exist, yes output of step 826, then the computer makes a determination as to whether the backup configuration transformation exception corresponds to an unknown backup configuration (step 832). If the computer determines that the backup configuration transformation exception does correspond to an unknown backup configuration, yes output of step 832, then the process returns to step 802 where the process starts again. If the computer determines that the backup configuration transformation exception does not correspond to an unknown backup configuration, no output of step 832, then the computer makes a determination as to whether the backup configuration transformation exception corresponds to a new data backup technology (step 834).

If the computer determines that the backup configuration transformation exception does correspond to a new data backup technology, yes output of step 834, then the process returns to step 812 where the computer defines the backup configuration transformation contextual actions. If the computer determines that the backup configuration transformation exception does not correspond to a new data backup technology, no output of step 834, then the computer makes a determination as to whether the backup configuration transformation exception corresponds to a change in the target environment (step 836).

If the computer determines that the backup configuration transformation exception does correspond to a change in the target environment, yes output of step 836, then the process returns to step 806 where the computer analyzes characteristics of a set of one or more backup configurations corresponding to the new target environment. If the computer determines that the backup configuration transformation exception does not correspond to a change in the target environment, no output of step 836, then the computer determines that the backup configuration transformation exception corresponds to an unknown exception (step 838).

Subsequently, the computer sends a notification to a subject matter expert to review the unknown exception (step 840). Afterward, the computer receives a set of one or more modifications to the backup configuration transformation plan based on the review of the subject matter expert of the unknown exception (step 842). The computer modifies the backup configuration transformation plan based on the set of one or more modifications (step 844). Thereafter, the process returns to step 820 where the computer generates a new backup configuration transformation plan.

Thus, illustrative embodiments provide a computer-implemented method, computer system, and computer program product for managing data backup configuration transformation from a data backup configuration corresponding to a source virtual machine environment to a set of data backup configurations corresponding to a target virtual machine environment during migration of a set of workloads from the source virtual machine environment to the target virtual machine environment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for managing data backup of workloads, the workloads being migrated from a source environment to a target environment, the computer-implemented method comprising:

identifying, by a computer, a set of workloads for migration from the source environment to the target environment in response to receiving a request to migrate the set of workloads;

initiating, by the computer, the migration of the set of workloads from the source environment to the target environment along with migration of the backup data corresponding to the set of workloads;

determining, by the computer, a backup configuration transformation from a backup configuration corresponding to the source environment to a set of backup configurations corresponding to the target environment based on semantic matching between characteristics of the backup configuration corresponding to the source environment and characteristics of the set of backup configurations corresponding to the target environment, a state of the source environment, backup configuration transformation actions, and a goal state of the target environment, wherein the characteristics include data dependencies between virtual machines executing the set of workloads and wherein the set of workloads is migrated in waves based on the data dependencies;

analyzing, by the computer, the characteristics of the backup configuration corresponding to the source environment for each workload in the set of workloads for the migration to the target environment;

analyzing, by the computer, the characteristics of the set of backup configurations corresponding to the target environment, wherein the backup data migration represents a migration of all backed up data corresponding to the set of workloads being migrated in the set of workloads migration;

performing, by the computer, the semantic matching between the characteristics of the backup configuration corresponding to the source environment and the characteristics of the set of backup configurations corresponding to the target environment for each backup capability; and forming the backup data corresponding to the set of workloads by performing a data backup for all virtual images in a particular wave before migrating the set of workloads from the source environment to the target environment.

2. The computer-implemented method of claim 1 further comprising:

defining, by the computer, the backup configuration transformation actions by representing each workload migration step in a set of workload migration steps in terms of input, output, precondition, and post-condition effect.

3. The computer-implemented method of claim 1 further comprising:

generating, by the computer, a backup configuration transformation plan based on the backup configuration transformation from the backup configuration corresponding to the source environment to the set of backup configurations corresponding to the target environment, wherein the backup data migration represents a migration of all backed up data corresponding to the set of workloads being migrated in the set of workloads migration.

4. The computer-implemented method of claim 3 further comprising:
executing, by the computer, the backup configuration transformation plan using a set of application programming interfaces.

5. The computer-implemented method of claim 1 further comprising:
monitoring, by the computer, the backup configuration transformation for an exception, wherein the exception is one of an unknown backup configuration exception, a new data backup technology exception, a change in target environment exception, or an unknown exception.

6. The computer-implemented method of claim 5 further comprising:
sending, by the computer, a notification to a subject matter expert to review the unknown exception;
receiving, by the computer, a set of modifications to a backup configuration transformation plan based on the review of the subject matter expert of the unknown exception; and
modifying, by the computer, the backup configuration transformation plan based on the set of modifications.

7. The computer-implemented method of claim 1, wherein the source environment is a data center environment, and wherein the target environment is a cloud environment.

8. The computer-implemented method of claim 1, wherein the source environment is a data center environment, and wherein the target environment is a hybrid cloud environment that includes a set of different cloud environments.

9. The computer-implemented method of claim 1, wherein the computer migrates the set of workloads and the backup data corresponding to the set of workloads from the source environment to the target environment concurrently.

10. A computer system for managing data backup, the computer system comprising:
a bus system;
a storage device connected to the bus system, wherein the storage device stores program instructions; and
a processor connected to the bus system, wherein the processor executes the program instructions to:
identify a set of workloads for migration from a source environment to a target environment in response to receiving a request to migrate the set of workloads;
initiate the migration of the set of workloads from the source environment to the target environment along with migration of the backup data corresponding to the set of workloads;
determine a backup configuration transformation from a backup configuration corresponding to the source environment to a set of backup configurations corresponding to the target environment based on semantic matching between characteristics of the backup configuration corresponding to the source environment and characteristics of the set of backup configurations corresponding to the target environment, a state of the source environment, backup configuration transformation actions, and a goal state of the target environment, wherein the characteristics include data dependencies between virtual machines executing the set of workloads and wherein the set of workloads is migrated in waves based on the data dependencies;
analyze the characteristics of the backup configuration corresponding to the source environment for each workload in the set of workloads for the migration to the target environment;
analyze the characteristics of the set of backup configurations corresponding to the target environment, wherein the backup data migration represents a migration of all backed up data corresponding to the set of workloads being migrated in the set of workloads migration;
perform the semantic matching between the characteristics of the backup configuration corresponding to the source environment and the characteristics of the set of backup configurations corresponding to the target environment for each backup capability; and
form the backup data corresponding to the set of workloads by performing a data backup for all virtual images in a particular wave before migrating the set of workloads from the source environment to the target environment.

11. A computer program product for managing data backup, the computer program product comprising a computer readable storage medium having program instructions embodied therewith, the program instructions executable by a computer to cause the computer to perform a method comprising:
identifying, by the computer, a set of workloads for migration from a source environment to a target environment in response to receiving a request to migrate the set of workloads;
initiating, by the computer, the migration of the set of workloads from the source environment to the target environment along with migration of backup data corresponding to the set of workloads;
determining, by the computer, a backup configuration transformation from a backup configuration corresponding to the source environment to a set of backup configurations corresponding to the target environment based on semantic matching between characteristics of the backup configuration corresponding to the source environment and characteristics of the set of backup configurations corresponding to the target environment, a state of the source environment, backup configuration transformation actions, and a goal state of the target environment, wherein the characteristics include data dependencies between virtual machines executing the set of workloads and wherein the set of workloads is migrated in waves based on the data dependencies;
analyzing, by the computer, the characteristics of the backup configuration corresponding to the source environment for each workload in the set of workloads for the migration to the target environment;
analyzing, by the computer, the characteristics of the set of backup configurations corresponding to the target environment, wherein the backup data migration represents a migration of all backed up data corresponding to the set of workloads being migrated in the set of workloads migration;
performing, by the computer, the semantic matching between the characteristics of the backup configuration corresponding to the source environment and the characteristics of the set of backup configurations corresponding to the target environment for each backup capability; and forming the backup data corresponding to the set of workloads by performing a data backup for all virtual images in a particular wave before migrating the set of workloads from the source environment to the target environment.

12. The computer program product of claim 11 further comprising:

defining, by the computer, the backup configuration transformation actions by representing each workload migration step in a set of workload migration steps in terms of input, output, precondition, and post-condition effect.

13. The computer program product of claim 11 further comprising:

generating, by the computer, a backup configuration transformation plan based on the backup configuration transformation from the backup configuration corresponding to the source environment to the set of backup configurations corresponding to the target environment, wherein the backup data migration represents a migration of all backed up data corresponding to the set of workloads being migrated in the set of workloads migration.

14. The computer program product of claim 13 further comprising:

executing, by the computer, the backup configuration transformation plan using a set of application programming interfaces.

\* \* \* \* \*